United States Patent Office 3,423,672
Patented Jan. 21, 1969

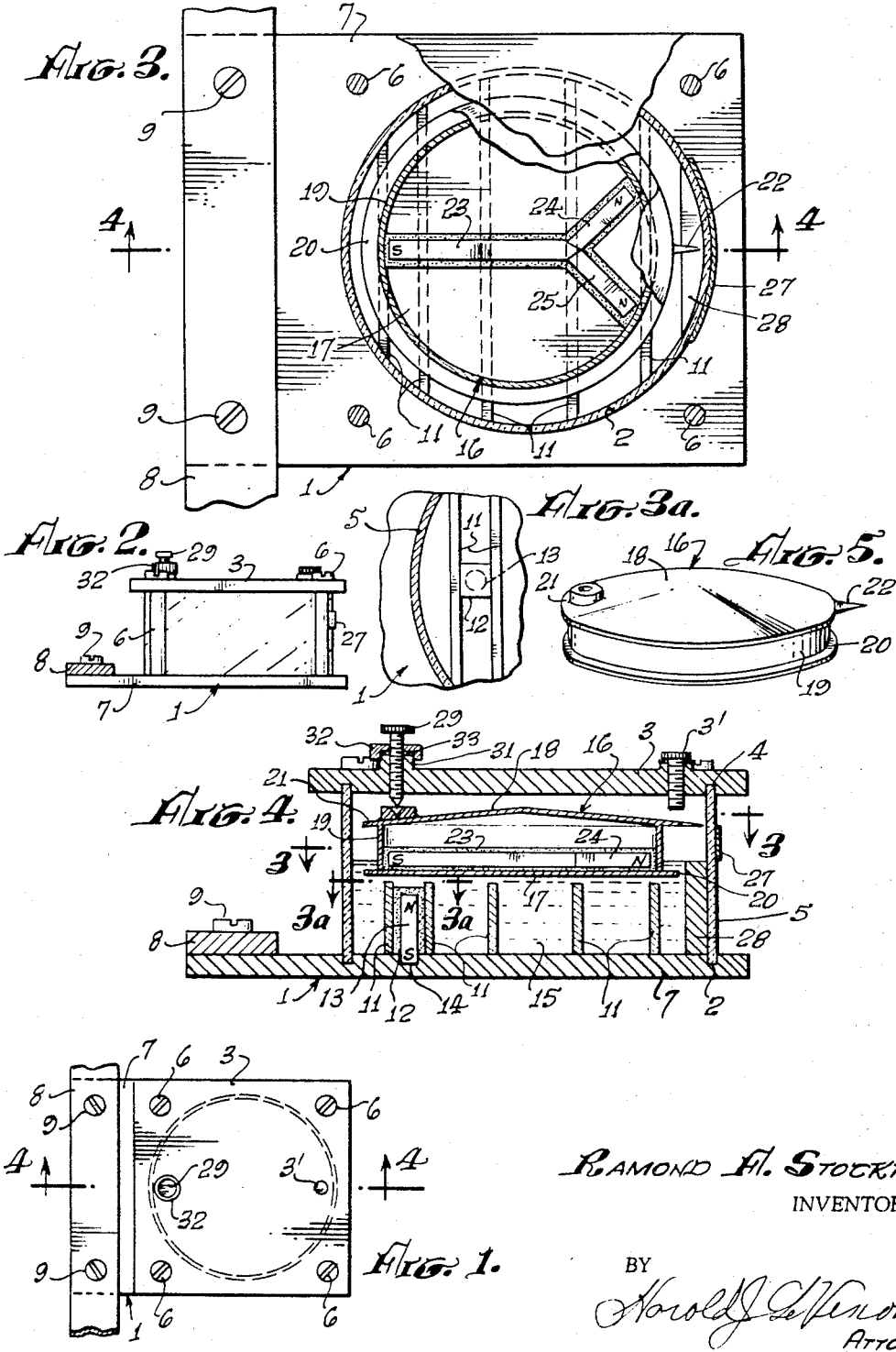

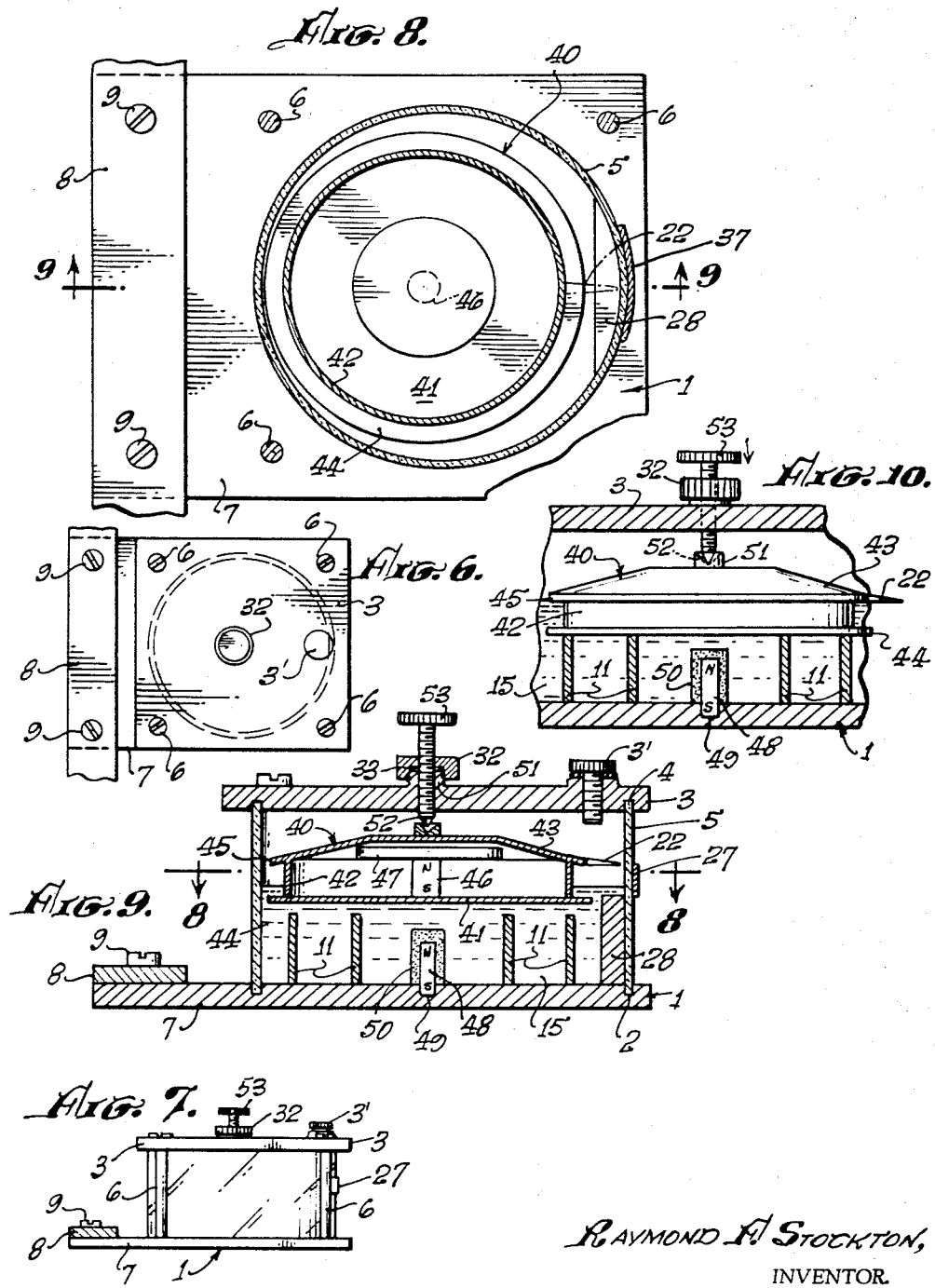

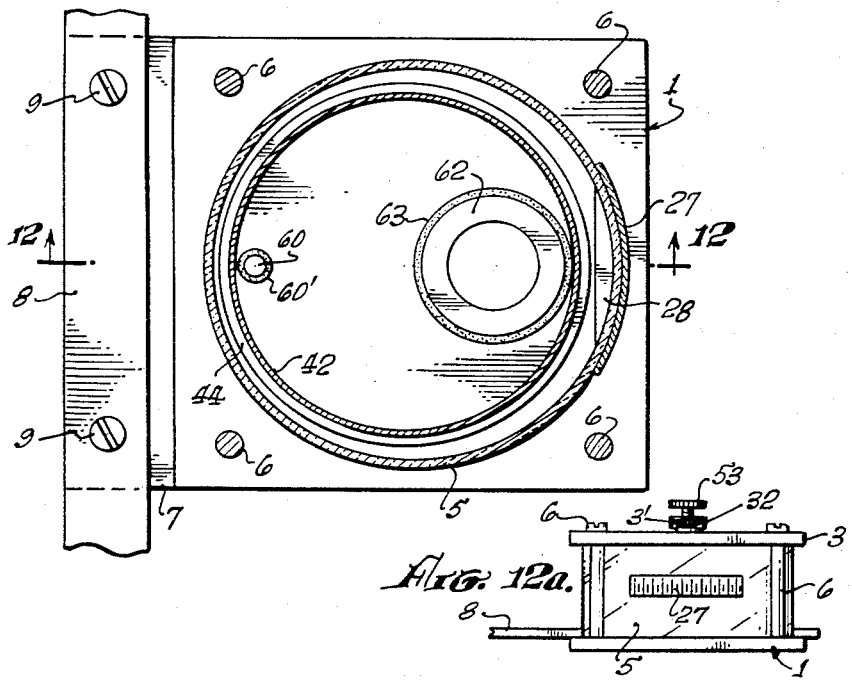
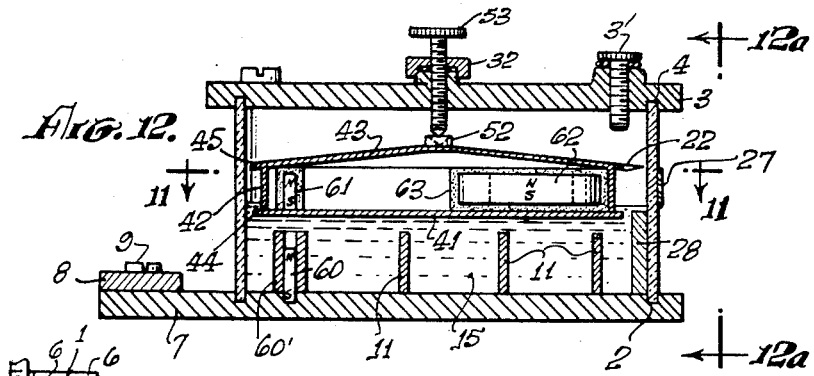
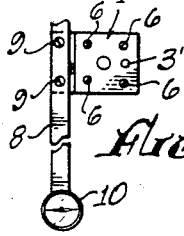
Raymond F. Stockton,
INVENTOR.

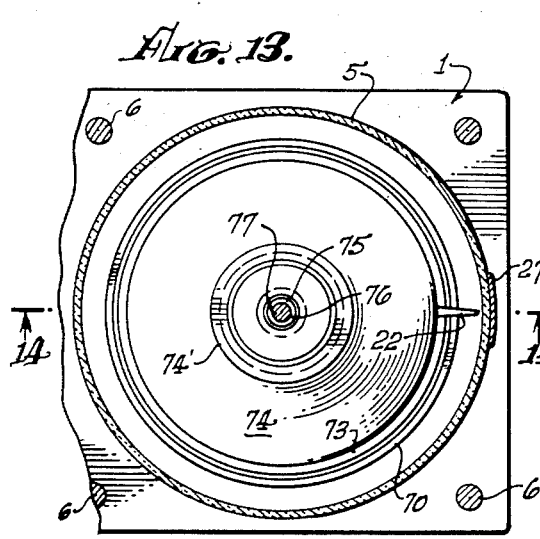
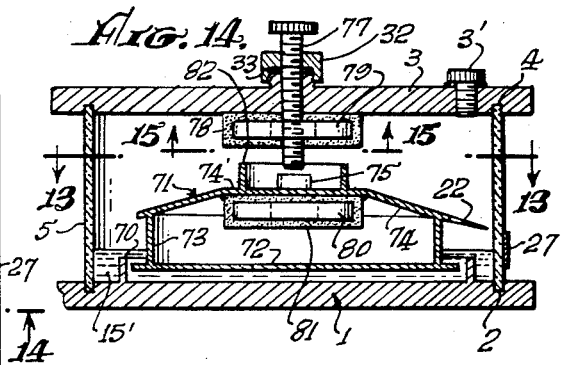
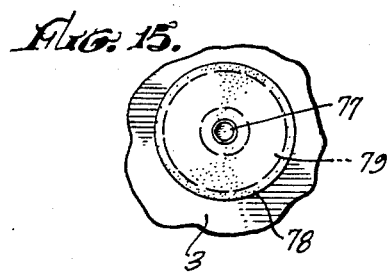
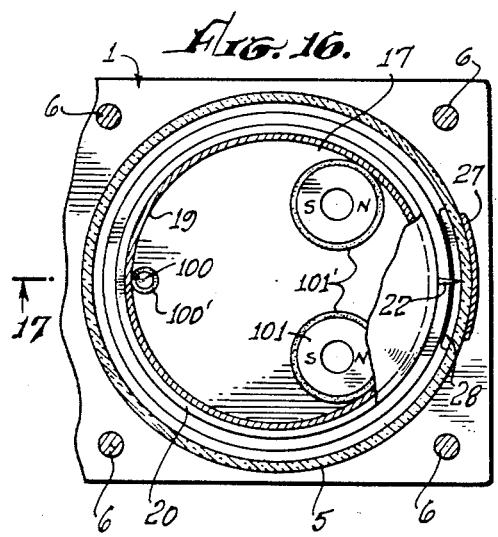
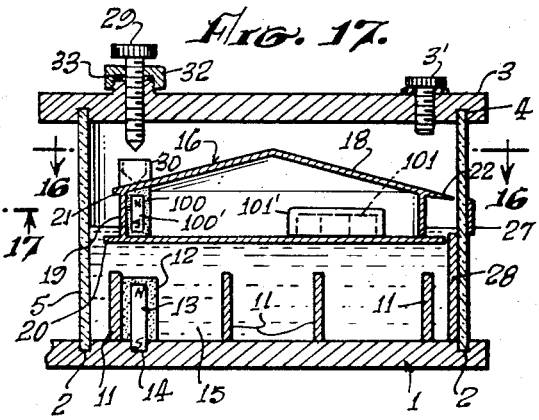

3,423,672
TERRESTRIAL MAGNETISM RESPONSIVE DEVICE INCLUDING FLUID SUPPORTED INDICATING MEANS FOR INVESTIGATING SUBSURFACE CHARACTERISTICS OF THE EARTH
Raymond F. Stockton, 41264 Whittier Ave., Hemet, Calif. 92343
Filed May 8, 1967, Ser. No. 636,898
U.S. Cl. 324—8                                      15 Claims
Int. Cl. G01v 3/08

ABSTRACT OF THE DISCLOSURE

A device highly sensitively responsive to terrestrial magnetism characterized by a buoyantly supported component carrying a magnetic north seeking element creating a laterally wide north seeking magnetic field and accordingly being subject to local anomalies in the earth's magnetic field and resultant deviation from indication of a true magnetic north as determined from an associated magnetic compass, the plotting of such deviations over an area serving to indicate the probable character of the earth within the area thus surveyed.

BACKGROUND OF THE INVENTION

*Field of the invention*

It is a well known fact that the sub-surface of the earth is composed of formations having varying physical properties in different locations. Certain types of sub-surface formations generate local magnetic force fields. It follows, and is a well known fact, that one mode of geophysical exploration employs the measuring of the variation in local magnetic force fields. With a general knowledge of influencing physical properties and with the measured magnetic variations, it is possible to predict the probable geological structure of the sub-surface in a given locale.

*Description of the prior art*

So far as is known to applicant, the only prior art is that disclosed in his co-pending application Ser. No. 328,888 filed Dec. 9, 1963. This belief derives from the fact that in the prosecution of that application, no device comparable to the subject matter of that application or of the instant invention was present in the cited art.

SUMMARY OF THE INVENTION

The device of the said co-pending application is characterized by the presence of an auxiliary means which applies an artificial magnetic deflection of the movable component, hereinafter called the "indicator," from indicating a true magnetic north with the resultant weakening of the magnetic field effect on the indicator allowing it to respond to local terrestrial magnetic anomalies. The present invention dispenses with this artificial deflecting means, and instead, employs an indicator carrying a magnetic north seeking means which presents a north seeking field of a relatively laterally wide area and which in the absence of any local anomalous magnetic condition will be centered on the local magnetic meridian line of the area but which can be influenced by local anomalous conditions and be deflected thereby from the true magnetic north. This may be accomplished in a number of different manners as the various embodiments hereinafter disclosed will illustrate.

The principal object of the invention is to provide an instrument for determining the presence and extent of anomalous sub-surface magnetic conditions including a buoyantly supported indicator which includes a magnetic north seeking means which produces a relatively laterally wide magnetic north seeking field whereby the existence and location of local anomalous sub-surface magnetic conditions will be revealed by deflections of that indicator from a compass indication of a true magnetic north.

Another object of the invention is to provide a device of the above character characterized by a buoyantly supported indicator having a pair of circumferentially spaced north seeking poles at one portion of the periphery thereof and a single self-seeking magnetic pole diametrically opposite the midpoint between said pair of north seeking poles.

A further object of the invention is to provide a device of of the character described in the principal objective of the invention in which the indicator is circular and is maintained in rotation about its axial line by spaced vertically disposed magnets disposed in the axial line of the indicator and having attraction for one another but maintained in spaced relation from one another by the buoyant support of the indicator.

Still another object of the invention is to provide an instrument of the character set forth in the foregoing principal objective in which the north seeking magnetic component of the indicator comprises a ring of paramagnetic material mounted adjacent the periphery of the indicator with the axis of the ring disposed vertically and being so magnetized that the upper portion of the ring is the north pole thereof and the lower portion of the ring is the south pole thereof.

Still another object of the invention is to provide a device of the character set forth in the primary objective in which the bottom surface of the housing carries a permanent magnet disposed vertically in the axial line of the indicator, in which the indicator carries an axially disposed permanent magnet cooperating with said first permanent magnet to establish a line about which said indicator may move as on an axis, and in which the upper end of said second permanent magnet carries a centrally disposed paramagnetic disc effective by the magnetism derived from said second magnet to constitute the north seeking means of said indicator.

Still another object of the invention is to provide a device of the character embodying the principal objective of the invention in which the north seeking magnetic means of the indicator comprises a pair of paramagnetic rings carried by the indicator adjacent the periphery of the indicator and spaced from one another, said rings being so magnetized that the edge portions thereof which are parallel to the indicating needle of the indicator constitute the north seeking poles and the diametrically opposite points on said rings constitute the south seeking poles thereof.

With the foregoing objects in view, together with such additional objects and advantages as may subsequently appear, the invention resides in the parts, and in the construction, combination and arrangement of parts disclosed, by way of example, in the attached drawings showing certain presently preferred embodiments of the invention.

BRIEF DESCRIPTION OF THE DRAWINGS

In the drawings:

FIG. 1 is a top plan view which is generally typical of the embodiments of the invention shown in side elevation in FIGS. 4 and 17, FIG. 2 is a side elevational view of FIG. 1, FIG. 3 is an enlarged scale, sectional view of a first embodiment of the invention taken in the horizontal plane defined by the line 3—3 of FIG. 4, FIG. 3a is a fragmentary sectional plan view taken in the horizontal plane of the line 3a—3a of FIG. 4, FIG. 4 is a medial side elevational sectional view of the first embodiment of the invention in the same scale as FIG. 3 and taken in the vertical plane of the line 4—4 of FIG. 3, FIG. 5 is a perspective view of the indicator of the first embodiment of the invention, FIG. 6 is a top plan view generally typical of other embodiments of the invention shown in side elevational section in FIGS. 9, 12 and 14, FIG. 7 is a side elevational view of FIG. 6, FIG. 8 is an enlarged scale, top plan sectional view of a second embodiment of the invention taken in the horizontal plane defined by the line 8—8 of FIG. 9, FIG. 9 is a medial sectional side elevational view taken in the vertical plane defined by the line 9—9 of FIG. 8 and showing the indicator released for free north seeking action, FIG. 10 is a fragmentary view similar to FIG. 9 but showing the indicator clamped to prevent damage incident to transportation of the instrument, FIG. 11 is a top plan sectional view of a third embodiment of the invention, the view being taken in the horizontal plane defined by the line 11—11 of FIG. 12, FIG. 12 is a medial side elevational view of said third embodiment of the invention, the view being taken in the vertical plane defined by the line 12—12 of FIG. 11, FIG. 12a is a side elevational view typical of any of the embodiments as viewed from the side thereof on which the scale is mounted, FIG. 13 is a top plan sectional view of a fourth embodiment of the invention taken in the horizontal plane defined by the line 13—13 of FIG. 14, FIG. 14 is a medial side elevational sectional view of said fourth embodiment, the view being taken in a vertical plane defined by the line 14—14 of FIG. 13, FIG. 15 is a fragmentary bottom plan view of the stationary magnet means of the fourth embodiment of the invention, the view being taken in the horizontal plane defined by the line 15—15 of FIG. 14, FIG. 16 is a top plan sectional view of a fifth embodiment of the invention, the view being taken in the horizontal plane defined by the line 16—16 of FIG. 17, FIG. 17 is a medial side elevational view of said fifth embodiment of the invention, the view being taken in the vertical plane defined by the line 17—17 of FIG. 16, and FIG. 18 is a plan view of any of the embodiments of the invention coupled with a laterally spaced magnetic compass incident to use of the instrument.

DETAILED DESCRIPTION OF THE INVENTION

Referring first to FIGS. 1–5, the first embodiment of the invention comprises a fluid tight cylindrical body formed of non-magnetic material, preferably suitable metal or alloy, said body comprising a bottom plate 1 having a circular groove 2 in the upper face thereof, a top plate 3 having a circular groove 4 in the lower face thereof, and a generaly cylindrical, transparent side wall member 5, preferably of glass, having its lower and upper ends fitting into the grooves 2 and 4 and by gaskets or other means serving to form a fluid tight joint with the top and bottom plates. The plates 1 and 3 are of greater diameter than the side wall member and are preferably polygonal in peripheral configuration (here shown as being square) and a series of bolts 6 extending between the plates 1 and 3 exteriorly of the side wall member draw the plates into tight engagement with the ends of the side wall member. Preferably, the bottom plate includes a laterally extending portion 7 which serves as a means for supporting one end of an elongated bracket member 8 secured thereon by screws 9 and on the opposite end of which bracket member (see FIG. 18) a magnetic compass 10 is mounted for use as will be later explained in detail.

The bottom plate 1 within the confines of the side wall member 5 is provided with a series of parallel, vertically extending baffle members 11 which extend upwardly approximately half the height of the side wall member 5, said baffle members being shown as extending generally parallel to the bar or bracket member 8. Disposed between the two baffle members 11, 11 nearest to the bracket member 8 at the midlength of the baffles is a non-magnetic housing 12 enclosing a vertically disposed permanent magnet 13 having the north seeking end thereof uppermost and disposed slightly below the plane defining the upper edges of the baffle, the opposite end of said permanent magnet being disposed in a locating recess 14 in the upper surface of the bottom plate 1.

The bottom plate 1 and the side wall member 5 from a cavity containing a body of fluid 15 of sufficient depth to buoyantly support the hollow indicator 16 therein with the bottom of the indicator normally spaced slightly above the upper edges of the baffles and the top member 3 completes the enclosure of the cavity at a distance affording clearance above the indicator. Preferably, the top plate 3 is provided with a threaded filler plug 3' for the introduction and removal of the fluid, said filler plug and opening including a suitable gasket means to insure the complete sealing of the cavity.

The indicator 16 is of hollow, discoidal configuration and is formed of non-magnetic material including a flat bottom wall 17, a shallow conical top wall 18 and a circular side wall 19 of slightly lesser diameter than the top and bottom walls, said circular side wall being centrally located with respect to the peripheries of the top and bottom walls 17 and 18 with resultant formation of bottom and top radially extending ledge portions 20 and 21, the ledge portion 21 at one point in its periphery including a radially extending pointer 22. The indicator houses a Y-shaped north seeking permanent magnet means comprising a first permanent magnet 23 extending diametrically across the bottom wall 17 from a point adjacent the side wall 19 to a point approximately midway between the center of the indicator and the opposite point of the side wall from the said south seeking end of the magnet 23, a second permanent magnet 24 extending at an acute angle with respect to the line of the magnet 23 from the said opposite wall 19 to the adjacent end of the magnet 23, and a third permanent magnet 25 disposed in mirror image relationship to the magnet 24, the joining ends of the magnets 23, 24 and 25 being complementarily beveled to accommodate the juncture thereof as shown in FIG. 3.

The south seeking pole of the magnet 23 is disposed adjacent the wall 19 and the north seeking poles of the magnets 24 and 25 are disposed adjacent to the wall 19, wherefore, the meeting ends of the three magnets are attractionally coupled together.

Preferably, a housing means which may be either a foam plastic or other light weight material such as balsa wood encloses all three magnets and holds them in position in the indicator, the pointer 22 being disposed in the central line of the said magnetic means midway between the north seeking ends of the magnets 24 and 25.

The magnetic attraction between the fields of the south seeking end of the magnet 23 and the north seeking end of the magnet 13 provides, in effect, a pivot for swinging movement of the indicator at a point diametrically opposite the pointer 22 and a scale element 27 is disposed on the outer surface of the wall member 5 in the range of movement of the indicator and in registry with the pointer 22, said graduations reading from one end of the scale to the other. Additionally, a spacer member 28 may be provided within the fluid cavity to engage the flange 20 and thus protect the pointer 22 from contacting the inner surface of the wall 5.

Means to immobilize the indicator incident to transportation of the instrument from one place to another are provided, said means comprising a screw 29 threadedly extending through the top plate 3 and having a pointed end engageable with a complementary socket 30 in a boss 31 on the top wall 18 of the indicator, said boss being preferably disposed directly above the south seeking pole end of the magnet 23 and operative to clamp the indicator against the upper edges of the baffles 11. A lock nut 32 serves to secure the screw 29 in any position to which it may be moved and a resilient gasket 33 surrounding the screw serves to seal the threaded opening engaged by the screw.

Since the north seeking pole means of the indicator exerts its field over a relatively wide lateral area, it will be much more sensitive to any anomalies in local terrestrial magnetic force fields and will respond directly to such anomalies without the necessity for providing a deflecting force as was required by the device of the said co-pending application. All that is required for the use of the present device is that like the device of the co-pending application, it be mounted on a common support in the same manner as that device with a conventional magnetic compass disposed a sufficient distance from the device as not to be affected by the magnets of the device so that as the instrument is moved from place to place over an area to be plotted, the unit can be so positioned at each place that the magnetic compass zeroes on the magnetic north. Then the position of the pointer of the device as indicated on the scale is noted. After these readings are plotted on the area map, a determination of what is revealed by the survey can be made.

Referring next to the second embodiment of the invention shown generally in FIGS. 6 and 7 and more specifically in FIGS. 8, 9 and 10, certain substantially identical parts have been given the same identifying numbers as in the first embodiment and will here be referred to by name or number only without repeating the description of or the relationship between them.

In this embodiment, the frame structure is similar in that it employs top and bottom plates separated by an interposed cylindrical side wall member, the bottom plates supporting a plurality of parallel baffles and the cavity formed by the plates and side wall member being filled with a suitable fluid to an extent sufficient to normally buoyantly support the indicator 40 slightly spaced above the upper edges of the baffles as shown in FIG. 9. The indicator 40 is formed of rigid, non-magnetic material and is of hollow, discoidal configuration comprising a flat bottom disc member 41 of lesser diameter than the interior of the cavity side wall member, a circular side wall member 42 of slightly less diameter than the member 41 centrally disposed thereon, and a top member 43 of shallow, frustoconical configuration having an outer diameter approximately equal to that of the bottom member 41 and centrally disposed on the wall member 42. The outer peripheries of the bottom and top members of the indicator form peripheral flanges 44 and 45.

Centrally of its internal cavity, the indicator 40 carries a short vertically disposed permanent magnet 46 disposed with the south seeking end secured to the upper face of the bottom wall member 41. The upper or north seeking end of the magnet 46 carries a centrally disposed disc 47 of paramagnetic material. The housing bottom wall 1 between the baffles 11 carries a vertically disposed permanent magnet 48 having the north seeking end uppermost and disposed slightly below the plane of the upper edges of the baffles, said magnet being disposed slightly eccentrically with respect to the center of the housing wall 5 (see FIG. 8) for a purpose to be presently explained. The south seeking end of the magnet 48 is preferably seated in a socket 49 formed in the housing bottom plate and the magnet is supported by being encased in a non-magnetic covering or sheath 50. The indicator top wall member 43 at its center is provided with a boss 51 in which a socket 52 is formed for engagement by the pointed end of a clamping screw 53 to clamp the indicator against the baffles and immobilize it for transportation of the instrument.

Experiments have shown that the indicator of this embodiment, though not employing the laterally spaced north seeking magnets of the first embodiment will tend to seek the local north magnetic meridian as affected by local anomalies, if any, and that if anything, it is even more sensitive to local magnetic influences than the first embodiment.

While at first glance, it might appear that the disc 47 might be insensitive to the earth's magnetic field, experiments proved that no permanent magnets are theoretically perfect and that in the case of vertically disposed cylindrical magnets, some one point in the periphery is always at least slightly stronger in the projected magnetic field than the rest of the peripheral surface and that when the magnet is mounted for magnetically coupled rotational movement about a vertical axis the magnet and, in this case the disc, will seek out the magnetic north and such local magnetic anomalies as may exist. Accordingly, it will be understood that for devices such as the second embodiment of the invention, the magnet means for seeking the magnetic north will have first been tested to ascertain the strongest north seeking point and that point will be aligned with the radial line of the pointer 22. Obviously, the less the relative distortion in the peripheral surface of the north seeking end of the indicator actuating magnet, the greater the sensitivity to local magnetic anomalies. Thus this embodiment of the invention may be employed to plot the magnetic conditions of an area in the same manner as the first embodiment with the probability that the instrument will be even more sensitive than the first embodiment.

In the third embodiment of the invention, shown in FIGS. 11 and 12, as in the second embodiment, those components generally similar to components in the preceding embodiments will be identified by the same numbers or names and will not again be described in detail. In this embodiment, a fixed permanent magnet 60 carried by the bottom plate 1 is disposed vertically at a point diametrically opposite the central point on the scale 27 and contained in a non-magnetic, tubular housing 60' with the north seeking pole uppermost and disposed below the plane containing the upper edges of the baffles, the radial position with reference to the vertical center line of the indicator being such as to position it directly beneath the vertically disposed permanent magnet 61 which is mounted on the upper face of the indicator bottom member 41 at a point diametrically opposite the pointer 22 thereof. The magnet 61 is housed in a non-magnetic casing and is disposed with the south seeking pole at the lower end thereof wherefore, the magnets 60 and 61 cooperate by the attraction between them to define an axis about which the indicator may move in response to terrestrial magnetic force in a manner similar to that of the indicator of the first embodiment.

The north seeking magnet means of the indicator of this embodiment comprises a ring-shaped permanent magnet 62 contained within the indicator at a point diametrically opposite the magnet 61, said ring-shaped magnet being housed by a covering 63 and being so magnetized that the upper surface thereof constitutes the north seeking pole and the lower portion the south seeking pole.

As in the previously described embodiments, the north seeking magnet means of the indicator creates a laterally wide north seeking magnetic field of substantially uniform strength throughout the lateral width of the ring, said field being somewhat diluted by the opposing magnetic field of the under side of the ring. As in the case of the second embodiment the north seeking point of maximum intensity on this ring magnet must first be ascertained by testing so that the magnet, when installed in the indicator will be positioned with its strongest north seeking bias or point disposed in the radial line of the pointer 22. Since the magnetic pivot is located at a distance from this ring, when the device is positioned for use with the pointer 22 generally directed toward magnetic north, the indicator will swing one way or another about the magnetic pivot in response to the terrestrial magnetic field by which it is affected. Since its north seeking field is relatively wide and weak, it will respond readily to any anomalies from the true magnetic north meridian which may exist at the point of survey. A typical mode of use of the device has already been described and need not be repeated.

At this point it should be mentioned that should the north seeking magnet means of the indicators of the second or third embodiments be located slightly out of the radial line of the pointer 22, the instrument is not handicapped in usefulness since readings at each location of the instrument are plotted against other readings by the same instrument.

The fourth embodiment of the invention is disclosed in FIGS. 13, 14 and 15 in which, as in the preceding figures, equivalent parts are designated by the same numbers as previously employed. In this embodiment, the upper face of the bottom plate 1 is formed with a low, circular wall 70 disposed coaxially spaced from and within the side wall member 5 and the cavity formed by the top and bottom plates and side wall members contains a body of fluid 15' which is sufficient only to extend slightly above the wall 70. The indicator 71 is formed of non-magnetic material and is buoyantly supported on the fluid 15'. It is of hollow discoidal configuration comprising a thin circular bottom plate 72 of slightly less diameter than the inside diameter of the wall 70, a circular side wall member 73 of slightly less diameter concentrically disposed thereon, and a frusto-conical top member 74 of the same diameter as the bottom member 72 disposed on the upper edge of the side wall member 73 in concentric relation thereto, said top wall member at one point on its peripheral edge carrying the radially extending pointer 22. The members forming the indicator are welded or otherwise interconnected to form a fluid tight enclosed interior space and the weight and consequent displacement of the indicator is such that relative to the depth of the fluid body 15', the outer edge of the bottom plate 72 is disposed within the confines of the wall 70 as shown in FIG. 14.

The center portion 74' of the indicator top wall member 74 is flat and carries a first concentrically disposed vertical wall 75 defining a socket 76 in which the end of a clamping screw 77 extending through the top wall 3 may be received to immobilize the indicator by clamping it against the top surface of the bottom plate 1 when the device is to be transported, said screw carrying the lock nut 32 and sealing gasket 33 at the outer face of the top plate 3. Mounted on the under face of the top plate 3 and enclosed within a non-magnetic housing means 78 is a ring type permanent magnet 79 disposed concentrically with respect both to the side wall member 5 and the screw 77, the said screw extending through the clearance afforded by the center opening of the magnet 79 and through the upper and lower walls of the magnet housing 78. The magnet 79 is so magnetized that at the upper side thereof constitutes a north seeking pole and the lower surface thereof the complementary south seeking pole.

The under side of the flat portion 74' of the indicator top wall carries a complementary, similarly magnetically oriented, permanent ring-shaped magnet 80 enclosed within a non-magnetic housing material 81 and the upper face of the indicator carries an annular wall 82 outside of and concentric with the wall 75 and of slightly greater height which acts, in the event of the indicator coming into contact with the magnet housing 78 to prevent the two magnets from coming into such proximity as would cause the indicator to be magnetically engaged against the stationary magnet 79. The mode of response of magnets of this character to terrestrial magnetic forces and the fact that the magnet must first be tested to insure that the point on the periphery having the greatest north seeking bias has been previously referred to.

Referring finally to the fifth embodiment of the invention, shown in FIGS. 16 and 17, those parts or components which are so nearly identical with those of the other embodiments will be merely referred to or designated by name or number without detailed reference to the function thereof. In general, this form of the invention is similar to that of the first embodiment except for the permanent magnet means of the indicator.

In this embodiment, the interior of the indicator, at a point adjacent the inner face of the wall 19 diametrically opposite the pointer 22 carries a vertically disposed permanent magnet 100 enclosed in a non-magnetic housing 100' disposed with the south seeking pole thereof adjacent the north seeking pole of the fixed magnet 13 and combining therewith to form a magnetically attractionally established pivot for the buoyantly supported indicator. At its opposite side, the interior of the indicator carries a pair of ring magnets 101, 101 enclosed in non-magnetic housings 101', 101' disposed at equal distances at opposite sides of a diametral line containing the pointer and the axial line defined by the magnets 13 and 100 and said magnets being so magnetized that the semicircular portions thereof most closely adjacent to the wall 19 is the north seeking pole thereof. Thus, these magnets form a weak, laterally wide north seeking field which can cause the indicator to respond significantly to minor variations or anomalies in the local terrestrial magnetic field and such response, will, of course, be apparent by the position of the pointer 22 along the scale 27. The mode of use of a device of this character has already been described and need not be repeated.

While in the foregoing specification certain presently preferred embodiments of the invention have been disclosed, such disclosure has been by way of example and it is not to be inferred therefrom that the invention is to be deemed to be specifically limited to the precise details of construction thus disclosed by way of example. Accordingly, the invention will be deemed to include all such changes and modifications in the parts and in the construction, combination and arrangement of parts as shall come within the purview of the appended claims.

I claim:

1. In a device for investigating subsurface characteristics of the earth by responsiveness of the device to local lines of terrestrial magnetic force, a housing, a body of fluid contained in said housing, a permanent magnet means in said housing establishing a vertically disposed magnetic field, a terrestrial magnetic responsive indicator element buoyantly supported in a horizontal plane by said body of fluid in non-contacting, vertically spaced relation to said permanent magnet means, other permanent magnet means carried by said indicator element operative both to attractionally cooperate with said permanent magnet means carried by said housing to establish a vertical axial line about which said indicator element is movable and to establish a horizontally wide north seeking magnetic field, and cooperating means on said indicator and said housing effective to indicate the extent of deflection of said indicator element in a horizontal plane from a predetermined position on said deflection indicating means selected to represent the local magnetic meridian as determined by a magnetic compass, said deflection deriving from a subsurface anomaly.

2. A terrestrial magnetism responsive device as claimed in claim 1 in which said magnet means carried by said housing is disposed below said indicator element.

3. A terrestrial magnetism responsive device as claimed in claim 1 in which said magnet means carried by said housing is disposed above the indicator element.

4. A terrestrial magnetism responsive device as claimed in claim 1 in which said indicator element is of hollow, discoidal configuration enclosing the permanent magnet means carried thereby, in which said enclosed magnet means comprises a vertically disposed permanent magnet disposed in the vertical center line of said indicator component and a paramagnetic metal disc mounted on the upper end of said vertically disposed magnet and in concentric relation thereto.

5. A terrestrial magnetism responsive device as claimed in claim 1 in said housing is cylindrical as viewed in plan, in which said permanent magnet means carried by said housing is disposed adjacent to the inner perimeter of said housing, in which said indicator element is also circular as viewed in plan, and in which said permanent magnet means carried by said indicator element includes a permanent magnet so disposed within said indicator element as to be positioned above said permanent magnet carried by said housing, and in which said magnets are so oriented as to cooperate attractionally to create a magnetic flux extending vertically serving as a pivot about which said indicator element may move.

6. A terrestrial magnestism responsive device as claimed in claim 1 in which both the interior of said housing and the exterior of said indicator element are circular as viewed in plan, in which said permanent magnet means carried by said indicator element includes a vertically disposed permanent magnet mounted therein at the vertical centerline of said indicator element, and in which said permanent magnet means carried by said housing comprises a vertically disposed permanent magnet mounted in spaced relation below and in vertical alignment with said vertically disposed permanent magnet carried by said indicator element; said permanent magnets being so oriented as to cooperate attractionally to create a vertically extending magnetic flux and serving as a pivot about which said indicator element may move.

7. A terrestrial magnetism responsive device as claimed in claim 1 in which said housing includes a circular side wall, in which said deflection indicating means includes a pointer extending radially from said indicator element toward said side wall and a scale element on said side wall of said housing having graduations and associated identifying values reading progressively from a selected one of said graduations, and in which said north seeking field establishing means is so positioned and oriented on said indicator element as to cause said pointer to register the deflection, if any, in the local terrestrial magnetic field relative to the true magnetic north as represented by registration of said pointer with a selected one of said graduations.

8. A terrestrial magnetism responsive device as claimed in claim 2 in which said indicator element carries a first magnetic component oriented for attractional cooperation with said permanent magnet means in said housing in the creation of a vertically extending magnetic flux of limited area about which said indicator component is movable as an axis and another magnetic means operative to produce said relatively wide, north seeking magnetic field.

9. A terrestrial magnetism responsive device as claimed in claim 3 in which said housing and said indicator element are each circular as viewed in plan and include bottom and top members and an interposed circular wall, in which the under side of said top member of said indicator element carries a ring-shaped permanent magnet concentric therewith and oriented so that the opposite side surfaces constitute the poles thereof, and in which the under side of said top member of said housing carries a corresponding similarly oriented ring magnet disposed in the centerline of said first ring magnet and attractionally cooperating therewith to form a magnetic flux about which said indicator element may move as on an axis.

10. A terrestrial magnetism responsive device as claimed in claim 5 in which said permanent magnet means carried by said indicator element for establishing said wide, north seeking magnetic field comprises a pair of north seeking magnets disposed at a point diametrically remote from said axial line establishing means and disposed apart equal distances from a diametrical line containing said axial line establishing permanent magnet and the center of said indicator element.

11. A terrestrial magnetism responsive device as claimed in claim 5 in which said indicator element is of hollow discoidal configuration including a circular side wall and a radially projecting pointer, in which said magnet means carried by said indicator element is enclosed therewithin and comprises a diametrically disposed, elongated bar magnet having the south seeking pole thereof adjacent the inner surface of said side wall at a point diametrically opposite said pointer, in which said permanent magnet means carried by said housing is disposed with the north seeking end uppermost to cooperate attractionally with said south seeking end to establish said vertical axial line, in which said bar magnet terminates short of the side of said indicator element adjacent said pointer and is attractionally connected to a pair of diverging bar magnets extending in the same horizontal plane as said first bar magnet and having the north seeking ends disposed adjacent said side wall at opposite sides of a diametrical line of said indicator element containing said pointer.

12. A terrestrial magnetism responsive device as claimed in claim 5 in which said indicator element is of hollow discoidal configuration including a circular side wall and a radially projecting pointer, in which said magnet means carried by said indicator element is enclosed therewithin and comprises a vertically disposed bar magnet having the south seeking end thereof downwardly adjacent to said side wall at a point diametrically opposite said pointer, in which said permanent magnet means carried by said housing is disposed with the north seeking end uppermost to cooperate attractionally with said south seeking end of said vertical bar magnet carried by said indicator element to establish said vertical axial line and in which said magnet means enclosed within said indicator element further include a ring-shaped permanent magnet disposed diametrically opposite said vertically disposed bar magnet and in which said ring-shaped magnet is so magnetically oriented that the respective poles thereof are represented by the opposite side faces thereof.

13. A terrestrial magnetism responsive device as claimed in claim 5 in which said indicator element is of hollow discoidal configuration including a circular side wall and a radially projecting pointer, in which said magnet means carried by said indicator element is enclosed therewithin and comprises a vertically disposed permanent bar magnet disposed adjacent said side wall with the south seeking end thereof constituting the lower end thereof, in which said permanent magnet means carried by said housing is disposed with the north seeking end thereof uppermost to cooperate attractionally with said south seeking end of said bar magnet carried by said indicator element to establish said vertical axial line, and in which said means for establishing said relatively wide horizontal, north seeking magnetic field comprises a pair of ring-shaped, permanent magnets disposed horizontally at opposite sides of a diametral line of said indicator element containing said pointer and adjacent to the inner face of said side wall which is adjacent to said pointer, said ring-shaped magnets being so magnetically oriented that the semicircular portions thereof which are adjacent the indicator element side wall constitute the north seeking poles thereof.

14. A terrestrial magnetism responsive device as claimed in claim 6 in which said housing comprises a circular body having the opposite ends thereof closed respectively by a bottom member and a top member and in which said top member includes screw threaded means operable to clamp said indicator element against said bottom member, said screw means extending through said ring-shaped permanent magnet means carried by said housing.

15. A terrestrial magnetism responsive device as claimed in claim 7 in which said selected one of said graduations is at the center of said scale and in which said values of said graduations read in opposite directions therefrom.

References Cited

UNITED STATES PATENTS

| | | | |
|---|---|---|---|
| 1,940,521 | 12/1933 | Acosta | 324—133 |
| 1,971,189 | 8/1934 | Leibing | 324—48 XR |
| 2,234,123 | 3/1941 | Ising | 324—8 |
| 2,261,030 | 10/1941 | Jenny | 324—48 XR |
| 3,183,434 | 5/1965 | Auer | 324—14 |
| 3,334,420 | 8/1967 | Stockton | 33—223 |

RUDOLPH V. ROLINEC, Primary Examiner.

G. R. STRECKER, Assistant Examiner.

U.S. Cl. X.R.

324—48; 33—223